(12) United States Patent
Hinderthür et al.

(10) Patent No.: US 8,406,630 B2
(45) Date of Patent: Mar. 26, 2013

(54) OPTICAL WDM TRANSMITTING AND RECEIVING DEVICE AND OPTICAL TRANSCEIVER UNIT FOR THIS DEVICE

(75) Inventors: Henning Hinderthür, Finning (DE); Oliver Bleck, Geretsried (DE)

(73) Assignee: ADVA Optical Networking SE, Meiningen (DE)

( * ) Notice: Subject to any disclaimer, the term of this patent is extended or adjusted under 35 U.S.C. 154(b) by 409 days.

(21) Appl. No.: 12/769,381

(22) Filed: Apr. 28, 2010

(65) Prior Publication Data
US 2010/0290785 A1 Nov. 18, 2010

(30) Foreign Application Priority Data
May 12, 2009 (DE) .................. 10 2009 021 010

(51) Int. Cl.
*H04J 14/02* (2006.01)
*G02B 6/28* (2006.01)
(52) U.S. Cl. ............ 398/79; 398/34; 398/43; 398/92; 370/241; 370/464
(58) Field of Classification Search .......... 398/79, 398/43
See application file for complete search history.

(56) References Cited

U.S. PATENT DOCUMENTS

| 5,592,284 A * | 1/1997 | Bedard .................. 356/73.1 |
| 7,274,871 B2 * | 9/2007 | Avallone et al. ............ 398/30 |
| 2003/0030875 A1 | 2/2003 | Barczyk |
| 2003/0165286 A1 * | 9/2003 | Ikushima et al. ............ 385/24 |
| 2004/0047295 A1 * | 3/2004 | Morreale .................. 370/241 |
| 2004/0156635 A1 * | 8/2004 | Felske et al. ................ 398/66 |
| 2005/0213979 A1 * | 9/2005 | Nakashima et al. ......... 398/79 |
| 2005/0244161 A1 | 11/2005 | Satoh |
| 2008/0089699 A1 | 4/2008 | Li et al. |

FOREIGN PATENT DOCUMENTS

| EP | 0 438 155 A2 | 7/1991 |
| EP | 1 978 653 A1 | 10/2008 |

* cited by examiner

*Primary Examiner* — Shi K Li
*Assistant Examiner* — Oommen Jacob
(74) *Attorney, Agent, or Firm* — The Culbertson Group, P.C.

(57) ABSTRACT

An optical transceiver unit for an optical WDM transmitting and receiving device is taught, with a transmitting unit to which a data signal can be fed to a specified channel input port of a multiplexer unit, wherein a separate channel wavelength is allocated to each channel input port, and the transmitting unit can be tuned with respect to optical carrier wavelength across a specified range of wavelengths. The transmitting unit is constructed so that, within the specified range of wavelengths, discrete wavelengths can be set that correspond to the channel wavelengths. In tuning mode, the controller unit can drive the transmitting unit so that the possible channel wavelengths are scanned through. The controller unit evaluates the reception signal fed to it from the receiving unit for whether abort criteria for tuning mode have been fulfilled or not, wherein the scanning process is continued until the abort criteria are fulfilled.

21 Claims, 1 Drawing Sheet

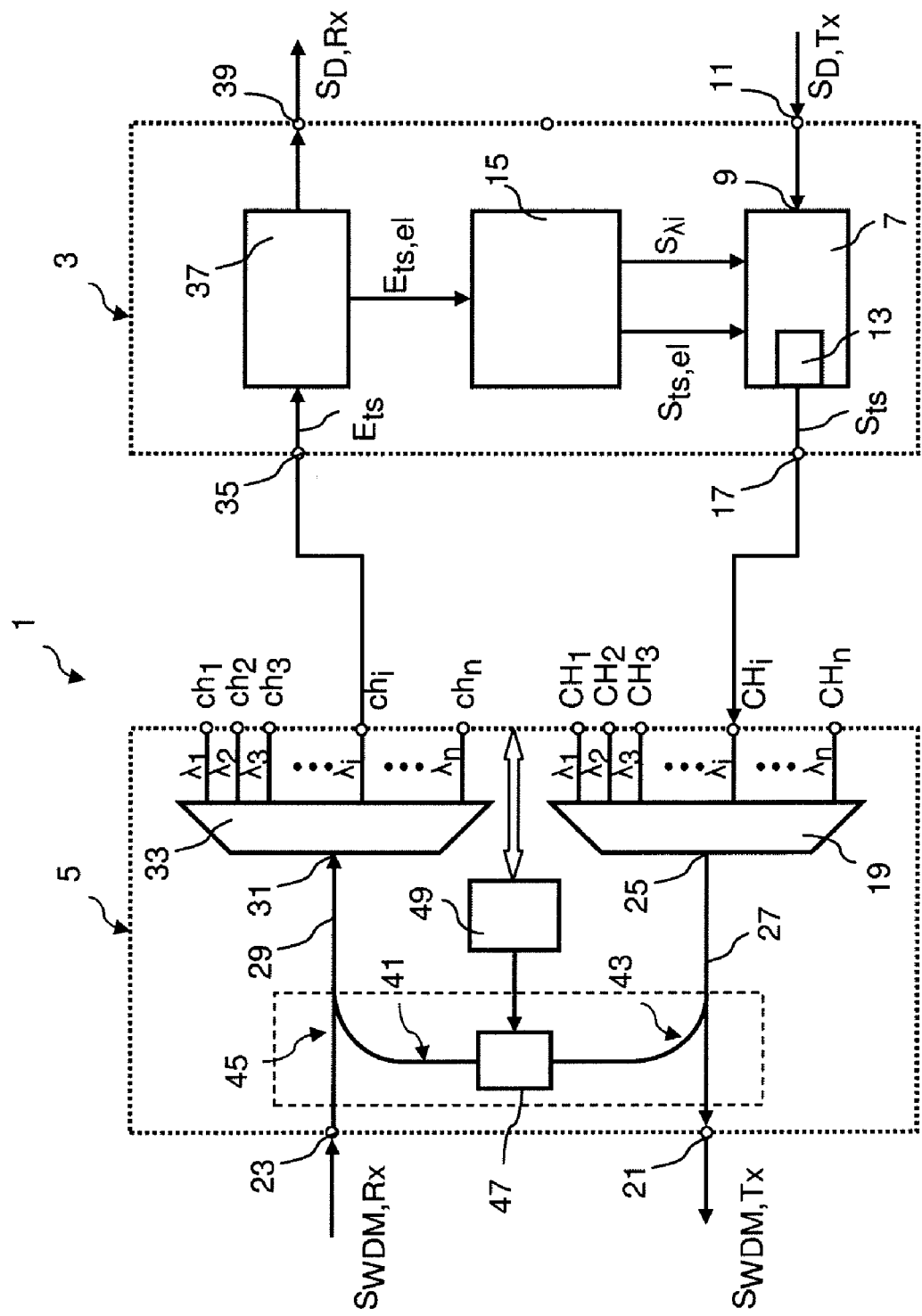

OPTICAL WDM TRANSMITTING AND RECEIVING DEVICE AND OPTICAL TRANSCEIVER UNIT FOR THIS DEVICE

FIELD OF THE INVENTION

The invention relates to an optical transceiver unit for an optical WDM transmitting and receiving device. In addition, the invention relates to an optical WDM transmitting and receiving device with such an optical WDM transceiver unit.

BACKGROUND

Optical wavelength division multiplexing systems (WDM systems) are used in optical transmission networks in order to transmit large volumes of data. In a network node or a terminal node of a simple point-to-point connection, an optical filter unit is provided that comprises at least one optical multiplexer unit and one optical demultiplexer unit. The optical multiplexer unit has a specific number n of channel input ports, and feeds optical channel signals fed to the channel input ports to a WDM output port, wherein the optical channel signals can be combined into one WDM signal. The optical demultiplexer unit has a WDM input port to which the WDM signal to be received is fed. The multiplexer unit splits the optical WDM reception signal into the individual channel signals and feeds each of these to an allocated channel output port. Each channel input port of the multiplexer unit can be fed an optical channel signal of a specified optical carrier wavelength, wherein each carrier wavelength of the fed optical signal must correspond to the channel wavelength allocated to the relevant channel input port, so that the relevant optical channel signal can be fed to the WDM output port correctly and with the lowest possible insertion attenuation.

In the same way, a channel signal of a specified optical carrier wavelength in a received optical WDM signal, wherein this carrier wavelength must correspond to a channel wavelength, can be extracted by the demultiplexer unit from the WDM reception signal and fed to the allocated channel output port. The channel wavelengths for the transmission direction and for the reception direction are here selected so that, for a channel i, both for the transmission direction and also for the reception direction, the same optical channel wavelength is used.

Typical optical filter units here usually have a plurality, for example, 40, channel input ports or channel output ports. To allow bidirectional connection on a specified channel, for each an optical transceiver unit is used that generates, from an electrical data signal fed to it, a corresponding optical data signal that is output on an optical output port of the transceiver unit. This optical output port of the transceiver unit is connected by means of an optical waveguide to the associated channel input port of the multiplexer unit of the optical filter unit. For this purpose, the channel input port of the multiplexer unit must be selected that corresponds, with respect to the channel wavelength, to the optical carrier wavelength of the optical signal output by the transceiver unit or, in other words, the carrier wavelength of the optical signal output by the transceiver unit must correspond to the channel wavelength of the selected channel input port of the multiplexer unit.

In the same way, the associated channel output port of the demultiplexer unit to which the relevant channel wavelength is allocated is connected to an input port of the optical transceiver unit that feeds, in the transceiver unit, the received channel signal to a receiving unit of the transceiver unit that typically has a broadband construction, so that it is able to detect each of the possible channel signals. The receiving unit converts the optical channel signal into a corresponding electrical data signal and can simultaneously carry out signal conditioning and optionally also signal processing.

Such optical transceiver units are typically provided with transmitting units that have an optical transmitting module of the desired channel wavelength. Therefore it is necessary to provide, for each channel wavelength, an optical transceiver unit with the desired (fixed) channel wavelength.

Recently, optical transceiver units have been developed with tunable transmission modules. In the case of such transceiver units, the transmitting unit comprising the relevant transmission module can be driven by a controller unit, so that an optical transmission signal with the desired channel wavelength is generated from the electrical data signal fed to the transceiver unit. The controller unit typically feeds to the transmitting unit only channel information. i.e., it is determined which of several possible discrete channel wavelengths should be used for the optical transmission signal to be generated.

With such tunable transceiver units, it is possible to connect a transceiver unit initially to an arbitrary free channel input port of the multiplexer unit of an optical filter unit. Obviously, the receiving unit of the transceiver unit must be connected to the allocated channel output port of the demultiplexer unit to which the same channel wavelength is allocated. In the case of known transceiver modules, information on which channel wavelength should be used for the optical transmission signal is then fed to the optical transmitting unit.

Here, however, there is the risk that the correct information concerning the channel wavelength to be selected is not transmitted to the controller unit of the optical transmitting unit, for example, because, in the case of the installation of the transceiver unit, the person performing this installation has transmitted incorrect information to the controller unit. In addition to this risk of incorrect installation of the transceiver unit, for example, on an existing WDM system, the requirement of the correct selection of the channel wavelength for a tunable optical transceiver unit also produces a corresponding expense. This is because the person who replaces a transceiver card or who expands the existing system through the addition of one or more additional transceiver cards, must be informed before the installation on which channel wavelengths are already occupied and which channel wavelengths of the system are still available or on which channel wavelengths the transceiver unit to be replaced has transmitted.

If the channel wavelength of a tunable optical transceiver unit is not selected correctly, then the multiplexer unit obviously cannot integrate the optical signal that is fed on a channel input port and that does not have the correct channel wavelength into the WDM signal to be transmitted.

SUMMARY OF THE INVENTION

The invention provides an optical transceiver unit for an optical WDM transmitting and receiving device that allows the simplest possible connection of the transceiver unit to a filter unit of the optical WDM transmitting and receiving device, wherein the risk of an incorrect setting of the channel wavelength is also reduced or avoided.

In the case of a tunable optical transceiver unit, an automatic setting of the correct optical carrier wavelength of the channel signal is generated by the transceiver unit. A controller unit is constructed so that it evaluates, in tuning mode, a reception signal fed to it from the receiver and decides, as a function of this signal, what channel wavelength is the correct one. For this purpose, the controller unit initially drives the transmitting unit in tuning mode so that a first of the possible channel wavelengths is used for a tuning transmitting signal to be generated. This transmitting signal is fed to the multiplexer unit on the relevant channel input port.

An optical WDM transmitting and receiving device has an optical connection path between the WDM output port of the multiplexer unit and the WDM input port of the demultiplexer unit. For this purpose, for example, by means of a broadband 1×2 coupler, a smaller portion of the optical power of the WDM transmitting signal is decoupled and fed, by means of another 1×2 coupler, to the optical reception path in the direction toward the WDM input port of the demultiplexer unit. By means of this loop-back path, it is possible for the optical transceiver unit to determine whether the transmitted channel signal with the current optical carrier wavelength (channel wavelength) is actually present on the output port of the multiplexer unit, which can be the case only when the channel wavelength for the relevant channel input port of the multiplexer unit was correctly selected.

For this purpose, the receiving unit of the transceiver unit detects in tuning mode and feeds the reception signal converted into an electrical signal to the controller unit. The controller unit uses abort criteria (which can also comprise several sub-criteria or several necessary prerequisites for the positive approval of the abort criteria), in order to be able to end tuning mode after reaching the setting of the correct channel wavelength.

If it is assumed that normally, no signal can be applied on the channel output port of the demultiplexer unit if the port is disconnected before the insertion of the transceiver unit, then the simplest abort criteria can consist in that optical output is actually detected on this port. In this case, the controller unit will end the tuning mode as soon as an optical signal (with sufficient power) is fed to it by the receiving unit.

If the abort criteria are not fulfilled, then the controller unit drives the optical transmitting unit of the transceiver unit so that another of the possible channel wavelengths is used for the tuning signal to be generated. In this additional step of the tuning mode, it is also detected, in turn, whether the abort criteria have been fulfilled. Thus, if necessary, all of the available channel wavelengths are used successively for generating a corresponding tuning transmitting signal, wherein the specified abort criteria are tested in each tuning step. If the abort criteria are fulfilled, then tuning mode is ended and the transceiver unit can change over to normal transmitting mode.

As the tuning signal, a data signal fed to the transmitting unit of the transceiver unit can also be used, wherein, in tuning mode, correct bidirectional communication is obviously not possible.

According to one version of the invention, the optical transmitting unit can also impress a characteristic property on the data signal fed to it, wherein, for this purpose, the transmitting unit is driven by the controller unit in a suitable way.

According to another version of the invention, the tuning transmitting signal can also be generated independently from a data signal fed to the transmitting unit, wherein, for this purpose, the controller unit can feed a suitable electrical tuning transmitting signal to the transmitting unit. This identification signal can obviously likewise feature specified characteristic properties.

According to one embodiment of the invention, the characteristic property of the identification signal or the one or more characteristic properties impressed on the data signal can be a defined parameter of a modulation component, advantageously a specified modulation frequency of an amplitude modulation. For example, the controller unit can drive the transmitting unit so that a high-bit-rate data signal is turned on and off at a relatively low frequency, wherein the turning on and off is performed at the specified frequency.

Instead of the modulation of a high-bit-rate transmitting signal, the controller unit may also feed to the transmitting unit an identification signal that is an amplitude-modulated signal with a single modulation frequency or with several different modulation frequencies, wherein, in the case of several modulation frequencies, these are not transmitted simultaneously but instead successively over time. For example, in CW mode, the transmitting module of the transmitting unit could be turned on and off at a relatively low frequency.

However, other means and methods for performing modulation are also possible. For example, a sinusoidal modulation of the data signal or a CW signal may be performed at a specific degree of modulation that may be less than 100%. In addition, it is also conceivable to use a frequency or phase modulation in order to impress specified characteristic properties onto the tuning signal.

A defined characteristic property, such as the modulation frequency of an amplitude modulation, may also be used in order to integrate an identifier uniquely allocated to the relevant transceiver unit into the tuning transmitting, signal. Obviously, it is also possible to transmit only part of a unique identifier, even if this produces reduced certainty.

The unique identifier can consist of, for example, a serial number of the transceiver unit or a Media Access Control address allocated to the transceiver unit.

In this way, it is possible that the controller unit checks the optical signal optionally fed to it from the receiving unit for whether this signal has, also with sufficiently high certainty, the characteristic properties in the transmitted tuning transmission signal.

If the characteristic property consists of an amplitude modulation at a specified frequency, then the controller unit can detect the reception signal fed to it (for the correct channel wavelength) with phase sensitivity, so that the abort criteria can be considered fulfilled only when the controller unit (or a lock-in amplifier contained in the unit) detects a reception signal with the previously known modulation frequency.

In this way it is possible to distinguish whether the detected reception signal is actually the transmitted tuning signal or at least contains this tuning signal. Otherwise, for example, in the case that a signal with the relevant channel wavelength is transmitted on the opposite end of the transmission path, this signal originating from the opposite side of the transmission path would be incorrectly identified as the tuning reception signal and tuning mode would be aborted, even though the correct channel wavelength was not set.

In addition to interference from the opposite side of the transmission path (this can consist of both a form of a data signal and also a form of a tuning signal used on the opposite side), interference can also be realized in that, on the same side of the transmission path, another transceiver unit is operating in tuning mode.

In order to increase the certainty even more, such that the tuning signal transmitted from the relevant transceiver unit was actually detected, the controller unit can determine the attenuation value between the detected reception signal and the optical tuning transmission signal and can view the abort criteria as fulfilled only when the attenuation value is less than a specified maximum value for whose determination, in particular, the crosstalk attenuation of the multiplexer unit and the demultiplexer unit of the WDM transmitting and receiving device is taken into account, as well as the attenuation of the optical path that the tuning transmission signal traverses up to reception by the receiving unit.

Otherwise, the risk would arise that a reception signal generated merely through crosstalk in the multiplexer unit or demultiplexer unit is also detected as a correct reception signal. This additional security measure is recommended especially when a highly sensitive detection of the reception signal is performed, for example, by means of phase-sensitive rectification.

In the same way, the controller unit may also determine the attenuation value between the detected reception signal and the optical tuning transmission signal and view the abort criteria as fulfilled only when the attenuation value is greater than a specified maximum value for whose determination, in particular, the insertion attenuation of the multiplexer unit and the demultiplexer unit of the WDM transmitting and receiving device can be taken into account, as well as the attenuation of the optical path that the tuning transmission signal traverses up to the reception by the receiving unit.

In this way it can be avoided that a reception signal is identified as a correct tuning reception signal, with this reception signal having been generated (with the correct channel wavelength) randomly by a different transceiver unit on the same side or on the opposite side of the transmission path, wherein the channel signal generated by the "separate" transmitting unit is still lying on an "incorrect" wavelength.

According to another version of the invention, in the loopback path of the optical WDM transmitting and receiving device, an optical modulator unit may be provided that can be driven by a control unit of the filter unit. In this way, additional information may be impressed on the tuning signal. Here, for example, certain parameters of the filter unit may be transmitted to the corresponding transceiver unit, such as, for example, characteristic data of the multiplexer unit, the demultiplexer unit, the control unit, a serial number, the number of channels, and the like.

The invention will be further explained in detail below with reference to an embodiment shown in the drawing.

BRIEF DESCRIPTION OF THE DRAWING

The single FIGURE shows a schematic block diagram of an optical WDM transmitting and receiving device according to the invention.

DETAILED DESCRIPTION OF PREFERRED EMBODIMENTS

The WDM transmitting and receiving device 1 shown in the single FIGURE comprises an optical transceiver unit 3 and an optical filter unit 5.

The optical transceiver unit 3 has an optical transmitting unit 7 to which an electrical data signal $S_{D, Tx}$ can be fed via a data signal port 9. For this purpose, the transceiver unit 3 may also have a data signal port 11. The optical transmitting unit 7 comprises an optical transmitting module 13 that can be tuned with respect to its optical carrier wavelength. In normal operating mode, the optical transmitting unit 7 converts the data signal $S_{D, Tx}$ fed to it into a corresponding optical data signal. The optical transmitting unit may also perform necessary signal conditioning or signal processing.

For this purpose, a controller unit 15 of the transceiver unit 3 drives the transmitting unit 7 so that a signal with a specified optical carrier wavelength is output on an output port 17 of the transceiver unit 3. For this purpose, the controller unit 15 feeds a control signal $S_{\lambda,i}$ to the transmitting unit 7. The control signal is here created advantageously so that only one set of channel information must be transmitted to the transmitting unit, in order to cause this to generate an optical transmission signal with a specified channel wavelength $\lambda_i$.

The channel wavelength $\lambda_i$ is here one of n possible optical carrier wavelengths that are generated by a maximum of n transceiver units 3 and fed to a channel input port $CH_1$ to $CH_n$ of an optical multiplexer unit 19 of the optical filter unit 5.

In the FIGURE, the output port of the transceiver unit 3 is fed to the channel input port $CH_i$ of the multiplexer unit 19. Additional (maximum n) transceiver units may also be connected to the remaining channel input ports. $CH_1$ to $CH_{i-1}$ and $CH_{i+1}$ to $CH_n$. A specified channel wavelength $\lambda_i$ is allocated to each channel input port $CH_i$ of the multiplexer unit 19, wherein, of each of the channel input ports $CH_1$ to $CH_n$, only those optical signals that have an optical carrier wavelength agreeing with the relevant channel wavelength $\lambda_i$ are combined into an optical WDM transmission signal $S_{WDM,Tx}$.

This optical WDM transmission signal $S_{WDM,Tx}$ is fed by means of a WDM output port 25 of the multiplexer unit 19 and by means of an optical path 27 to an optical output port 21 of the optical filter unit 5 and is output by means of this to an optical transmission path (not shown).

In the same way, an optical WDM reception signal $S_{WDM, Rx}$ can be fed to a WDM input port 23 of the optical filter unit 5. This WDM input port 23 is connected via an optical path 29 to a WDM input port 31 of a demultiplexer unit 33, so that the WDM reception signal $S_{WDM, Rx}$ is also fed to the WDM input port 31 of the demultiplexer unit 33.

The demultiplexer unit 33 has, in turn, n channel output ports that are designated in the FIGURE with $ch_1$ to $ch_n$. The same channel wavelength $\lambda_1$ to $\lambda_n$ as the relevant channel input port $CH_1$ to $CH_n$ is allocated to each of the channel output ports $ch_1$ to $ch_n$.

As becomes clear from the FIGURE, the channel output port $ch_i$ is connected accordingly to an input port 35 of the transceiver unit 3 that is connected, on its side, to an input port of a receiving unit 37 comprised by the optical transceiver unit 3.

In normal operating mode, the WDM reception signal $S_{WDM, Rx}$ fed to the WDM input port 23 by the connected transmission path (not shown) is fed to the WDM input port 31 of the demultiplexer unit 33. The demultiplexer unit 33 demultiplexes the optical WDM reception signal $S_{WDM, Rx}$ into the individual channel signals that are each fed to the corresponding channel output port $ch_1$ to $ch_n$ that has the relevant channel wavelength $\lambda_1$. In this way, according to the diagram in the FIGURE, the channel signal with the channel wavelength $\lambda_i$ is fed to the input port 35 of the transceiver unit 3 and thus to the receiving unit 37. The receiving unit 37 converts the optical channel signal into an electrical data signal $S_{D, Rx}$ and outputs this on a data signal port 39 of the transceiver unit 3.

For the correct operation of the transceiver unit 3 on the filter unit 5, it is thus necessary that the controller unit 15 drives the optical transmitting unit 7 so that the optical signal fed to the relevant channel input port $CH_i$ has the channel wavelength $\lambda_i$ allocated to this port. Otherwise, the optical signal would be blocked by the multiplexer unit 19 and not be integrated into the WDM transmission signal $S_{WDM, Tx}$.

If a transceiver unit 3 is newly connected to the optical filter unit 5, then, in tuning mode, the controller unit 15 performs the functions explained below. The tuning mode here can be triggered by hand or by a higher-order control unit by the feeding of a corresponding drive signal $S_T$.

At first it is to be mentioned that the controller unit 15 either must know in advance what discrete wavelengths are used by the WDM system or the WDM transmitting and receiving device 1 in which the transceiver unit 3 is to be integrated.

This is because a complete and continuous tuning of the optical transmission module would be too time-intensive. The discrete channel wavelengths here may be stored in advance in the controller unit 15. Obviously, however, it is also possible to feed this information on a suitable interface (not shown) from a higher-level unit to the controller unit 15.

After the controller unit 15 is set into tuning mode, this initially feeds a signal $S_{\lambda,i}$ to the optical transmitting unit 7, wherein, in this way, a first of the possible channel wavelengths is set. That is, due to the signal $S_{\lambda,i}$ fed to it, the transmitting unit 7 generates a tuning signal $S_{ts}$ that has the relevant channel wavelength $\lambda_i$.

Here, the tuning signal $S_{ts}$ can be generated in various ways. First, it is possible to use an already applied data signal $S_{D, Tx}$ and to convert this into a corresponding optical signal that is then used as the tuning signal $S_{ts}$. It is likewise possible to ignore the data signal $S_{D, Tx}$ and to instead generate a special, independent tuning signal. For this purpose, the controller unit 15 can feed to the transmitting unit 7 a corresponding electrical tuning signal $S_{ts, el}$. This special tuning signal $S_{ts, el}$ can be constructed, for example, as a low-frequency signal with a fixed frequency (whether with a sinusoidal or rectangular or a different periodic structure). In this case, the optical tuning signal $S_{ts}$ that is output on the output port 17 of the transceiver unit 3 would then have a corresponding time sequence, with the optical carrier wavelength being fixed by the signal $S_{\lambda 1}$ with which the controller unit 15 drives the transmitting unit 7.

According to another alternative, the optical signal $S_{ts, el}$, that is a relatively low-frequency signal, can be used as a modulation signal for the high-bit-rate data signal $S_{D, Tx}$.

If the channel wavelength selected in the first step of the tuning mode does not agree with the correct channel wavelength that is allocated to the channel input port $CH_i$, then the tuning signal $S_{ts}$ is not transmitted via the multiplexer unit 19 to its WDM output port 25. Thus, by means of the receiving unit 37, no optical tuning reception signal $E_{ts}$ can be detected that can be fed, converted opto-electrically, as the electric tuning reception signal $E_{ts, el}$ of the controller unit 15.

The reception of such a tuning reception signal $E_{ts}$ would be possible, in principle, for the correctly selected channel wavelength, because, as becomes clear from the FIGURE, the two optical paths 27 and 29 are connected by means of a loop-back path 41. This is realized by an optical 1×2 coupler 43, 45 in the relevant optical path 27, 29. The optical couplers 43, 45 are here constructed so that only a relatively small portion of the power of the signal fed in the path 27 in the direction toward the WDM output port 21 of the filter unit 5 is decoupled and coupled via the loop-back path 41 into the optical path 29 in the direction toward the WDM input port 31 of the demultiplexer unit 33.

Thus, in the first step of the tuning mode, if absolutely no reception signal is detected, then the controller unit 15 drives the optical transmitting unit 7 so that a different channel wavelength $\lambda_i$ is set. This step-by-step scanning is continued until the controller unit 15 detects a tuning reception signal $E_{ts, el}$ that is fed to it from the optical reception unit 37. At this point it should be noted that the optical reception unit 37 is constructed, as usual, so that each of the selectable channel wavelengths can be detected.

If a tuning reception signal $E_{ts, el}$ is fed to the controller unit 15, then, in the simplest case, just this fact may be used by the controller unit 15 as abort criteria for the loop that is to be performed in tuning mode, because in this simplest case, the controller unit 15 can use just the presence of a detected signal $E_{ts, el}$ with arbitrary properties as indication that a signal was transmitted via the loop-back path 41 and consequently the transmitting unit 7 operates with the correct transmission wavelength or channel wavelength. In this case, only a certain minimum level for the reception power of the optical signal $E_{ts}$ is decisive.

However, because a signal can also be fed via the transmission path to the relevant channel output port $ch_i$ of the demultiplexer unit 33, the controller unit 15 advantageously detects whether the tuning reception signal $E_{ts, el}$ fed to it has a characteristic property known to it.

As already mentioned above, the controller unit 15 can drive the transmitting unit 7 so that a certain special tuning signal $S_{ts}$ is generated that has, for example, a certain (low) base frequency. If the controller unit 15 detects the same characteristic property also in the tuning reception signal $E_{ts,el}$ fed to it, then it can be assumed with relatively high certainty that this reception signal was generated by the transmitting signal $S_{ts}$ that was fed via the loop-back path 41 to the receiving unit 37. For the generation of corresponding characteristic properties of the tuning signal $S_{ts}$, in light of the disclosure herein, there are a plurality of different possibilities that someone skilled in the art may employ, such as, for example, the possibility mentioned above of amplitude modulation. As additional possibilities, frequency-modulated or phase-modulated signals with certain characteristic properties present themselves.

In order to not randomly detect a tuning reception signal $E_{ts, el}$ indeed incorrectly as a correct "reception signal" that could be generated, for example, by another transceiver unit 3 located at the other end of the transmission path in tuning mode (even if this case is very 17 unlikely), the tuning signal $S_{ts}$ can be made unique in that this signal contains the information of a unique serial number or MAC address of the relevant transceiver unit 3. If there are, for example, five-digit unique serial numbers, then $10^5$ different values are sufficient for one or more defined characteristic properties (or parameters) of the tuning signal. For example, $10^5$ different frequency values could be selected for the amplitude modulation. The controller unit 15 can then not only detect that a signal is detected for a correctly selected channel wavelength $\lambda_i$, but instead can also check whether the detected signal has the identifier known to it, namely the serial number corresponding to the modulation frequency.

For example, by means of a lock-in amplifier integrated into the controller unit 15, the corresponding modulation frequency can also be detected. The controller unit 15 can then view the abort criteria for the tuning loop as fulfilled only when the tuning reception signal $E_{ts, el}$ has the correct frequency corresponding to the serial number.

It is likewise possible to not allocate the entire serial number or the entire identifier or MAC address to a certain frequency, for example, if a corresponding required number of different identifiers or modulation frequencies can no longer be resolved at the reception. In this case it presents itself to use only a smaller number of positions, for example, only one, two, or three positions of the serial number or identifier for generating a certain value for the characteristic property or frequency of the tuning signal $S_{ts}$. Nevertheless, for certainty, if all of the positions are to be checked in the tuning reception signal, then the transmission of all of the positions of the serial number or identifier can also take place successively over time.

As additional certainty, the reception level for the signal $E_{ts, el}$ can also be tested with respect to its plausibility.

For example, the controller unit 15 can also detect whether the reception level for the reception signal $E_{ts}$ is greater than a specified bound. This is because, for an extremely sensitive detection of the reception signal, theoretically a signal can also be detected that is generated by a channel signal with the incorrect wavelength, wherein a corresponding reception signal would be generated by finite values for the crosstalk attenuation of the multiplexer unit or demultiplexer unit 19, 33.

The certainty may therefore be increased when the controller unit 15 views the abort criteria as fulfilled only when the tuning reception signal $E_{ts}$ exceeds a certain reception level.

In order to also exclude that a signal is received from the other end of the transmission path, with this signal randomly having the same characteristic properties (of the time sequence) as the signal $S_{ts}$ transmitted at the moment from the transmitting unit 7 (but having the incorrect channel wavelength), the controller unit 15 also checks whether the reception signal $S_{ts}$ (or the corresponding electrical reception signal $E_{ts, el}$) does not exceed a specified maximum level. This is fixed by the specified insertion attenuation of the optical path between the output port 17 and the input port 35 of the transceiver unit 3 via the path that is fixed by the loop-back path 41.

Thus, in addition to its time sequence, the controller unit 15 can also test the level of the reception signal as the characteristic property for whether this lies in a permissible range.

In addition, in the loop-back path 41 there can be a modulator unit 47 that can be driven by a control unit 49 of the filter unit 5. The modulator unit 47 can also be connected to a higher-order control unit, as shown in the FIGURE by means of the double arrow. By means of the optical modulator unit 47, the control unit 49 can thus impress additional information on the signal guided via the loop-back path 41. This information can likewise be received by the controller unit 15. Here it can involve certain properties or characteristic data of the filter unit, such as, for example, the serial number, the number of channels, the carrier wavelengths of the channels, and the like.

If the controller unit 15 detects the abort criteria as fulfilled, then tuning mode is ended. If the abort criteria are detected as fulfilled in none of the individual steps of the tuning mode, for example, because the input port 35 of the transceiver unit 3 is not connected to the correct channel output port $ch_1$ to $ch_n$, then an error signal could be generated.

A WDM transmitting and receiving device created in this way or such an optical transceiver unit allows the automatic setting of the correct channel wavelength, without significant intervention of an operating person being necessary for this purpose (apart from optionally the required starting of tuning mode). In this way, possible errors are significantly reduced when such a transceiver unit is started.

As used herein, the terms "comprising," "including," "carrying," "having." "containing," "involving." and the like are to be understood to be open-ended, that is, to mean including but not limited to.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. An optical WDM transmitting and receiving device including at least one optical transceiver unit and an optical filter unit:
   (a) the at least one optical transceiver unit including a transmitting unit:
      (i) the transmitting unit adapted to receive a data signal fed to it at a data signal port, wherein the transmitting unit feeds the data signal, converted into a corresponding optical transmission signal, to an optical output port of the transceiver unit that can be connected to a specified channel input port of an optical multiplexer unit included in the optical filter unit, wherein a separate channel wavelength is allocated to each channel input port of the optical multiplexer unit;
      (ii) wherein the transmitting unit has an optical transmitting module that can be tuned with respect to its optical carrier wavelength across a specified range of wavelengths; and
      (iii) wherein the transmitting unit is constructed so that, within the specified wavelength range, discrete wavelengths can be set that correspond to each of the channel wavelengths;
   (b) the at least one optical transceiver unit including a receiving unit adapted to receive an optical reception signal fed to it via an optical input port of the transceiver unit from a channel output port of an optical demultiplexer unit included in the optical filter unit having channel output ports each allocated to the same channel wavelength as the channel input ports of the optical multiplexer unit, wherein the receiving unit converts an optical signal fed to it into an electrical reception signal;
   (c) the at least one optical transceiver unit including a controller unit that drives the transmitting unit so that an optical transmission signal is generated with a specified channel wavelength;
   (d) wherein the receiving unit feeds the opto-electrically converted reception signal to the controller unit;
   (e) wherein the same channel wavelength is allocated to the channel input port of the optical multiplexer unit which is connected to the optical output port of the transceiver unit and to the channel output port of the optical demultiplexer unit which is connected to the optical input port of the receiving unit;
   (f) wherein a portion of the optical power of a WDM transmission signal created at a WDM output port of the multiplexer unit is supplied to a WDM input port of the demultiplexer unit; and
   (g) wherein the controller unit is adapted to be set into tuning mode in which the following actions are carried out:
      (i) the controller unit drives the transmitting unit, so that an optical tuning transmission signal is generated with a specified channel wavelength;
      (ii) the controller unit evaluates the reception signal for whether abort criteria for tuning mode have been fulfilled or not;
      (iii) if the abort criteria have been fulfilled, then the controller unit ends tuning mode and drives the transmitting unit into operating mode of the transceiver unit, so that the data signal fed on the data signal port is converted into an optical transmission signal with the channel wavelength for which the abort criteria are detected in tuning mode; and
      (iv) if the abort criteria are not fulfilled, then the controller unit continues tuning mode with a further step according to features (g) (ii) and (g) (iii) of this claim, wherein the controller unit drives the transmitting unit in the further step so that an optical tuning signal is generated with a channel wavelength that was not previously used in tuning mode.

2. The optical WDM transmitting and receiving device of claim 1, wherein the transmitting unit is further adapted such that, in each tuning step, the optical tuning transmission signal with the channel wavelength is used such that:

(a) the tuning transmission signal corresponds to the data signal fed to the transmitting unit; or
(b) the tuning transmission signal corresponds to the data signal fed to the transmitting unit, wherein at least one characteristic property is impressed on the data signal, with the controller unit transmitting this characteristic property to the transmitting unit; or
(c) the tuning transmission signal corresponds to an identification signal that is fed from the controller unit to the transmitting unit and that has at least one characteristic property.

3. The optical WDM transmitting and receiving device of claim 2, wherein the one or more characteristic properties of the identification signal, or the one or more characteristic properties impressed on the data signal, are defined parameters of a modulation component, advantageously with a specified modulation frequency of an amplitude modulation.

4. The optical WDM transmitting and receiving device of claim 3, wherein the controller unit feeds the identification signal to the transmitting unit, and wherein this identification signal is an amplitude-modulated signal with a single modulation frequency or with several different modulation frequencies that vary in a time sequence.

5. The optical WDM transmitting and receiving device of claim 4, wherein each modulation frequency is allocated to a character or a character sequence according to a specific scheme known to the controller unit, and wherein the relevant character or character sequence is a component of a unique identification of the transceiver unit.

6. The optical WDM transmitting and receiving device of claim 1, wherein the controller unit considers the abort criteria as fulfilled when the reception signal reaches or exceeds a specified minimum reception level.

7. The optical WDM transmitting and receiving device of claim 6, wherein the controller unit considers the abort criteria as fulfilled when, in addition, the reception signal is identical with the tuning transmission signal or has specified characteristic properties of the tuning transmission signal.

8. The optical WDM transmitting and receiving device of claim 4, wherein the controller unit performs phase-sensitive detection for the reception signal and uses, for this purpose, known modulation frequency as information.

9. The optical WDM transmitting and receiving device of claim 6, wherein the controller unit determines an attenuation value between the detected reception signal and the optical tuning transmission signal and considers the abort criteria as fulfilled only when the attenuation value is less than a specified maximum value for whose determination, in particular, the crosstalk attenuation of the multiplexer unit and the demultiplexer unit of the WDM transmitting and receiving device is taken into account, as well as the attenuation of the optical path that the tuning transmission signal traverses until it is received by the receiving unit.

10. The optical WDM transmitting and receiving device of claim 6, wherein the controller unit determines the attenuation value between the detected reception signal and the optical tuning transmission signal and, in addition, considers the abort criteria as fulfilled only when the attenuation value is greater than a specific maximum value, for whose determination, in particular, the insertion attenuation of the multiplexer unit and the demultiplexer unit of the WDM transmitting and receiving device is taken into account, as well as the attenuation of the optical path that the tuning transmission signal traverses until it is received by the receiving unit.

11. The optical WDM transmitting and receiving device of claim 1:

(a) wherein the WDM output port of the multiplexer unit is connected to an input port of an optical splitter unit whose one output port can be connected to an optical transmission path and whose other output port is connected to an optical loop-back path; and
(b) wherein the WDM input port of the demultiplexer unit is connected to an output port of an optical combiner unit whose one input port can be connected to the optical transmission path and whose other input port is connected to the loop-back path.

12. The optical WDM transmitting and receiving device of claim 11, wherein an optical power decoupled on the loop-back path is small relative to the optical power of the optical transmission signal.

13. The optical WDM transmitting and receiving device of claim 11, wherein in the loop-back path, an optical modulator unit is arranged so that it can be driven by a control unit and the controller unit of the transceiver unit detects and evaluates or stores in tuning mode information modulated on the detected reception signal from the control unit by means of the optical modulator unit, wherein the information can contain characteristic data of a WDM filter unit comprising the multiplexer unit, the demultiplexer unit, the control unit, and the loop-back path, including the modulator.

14. The optical WDM transmitting and receiving device of claim 13, wherein the characteristic data comprised in the information includes serial number, number of channels, and carrier wavelengths of individual channels.

15. A method of operating a WDM transmitting and receiving device, comprising:
(a) setting a controller unit of the WDM transmitting and receiving device into tuning mode in which the following actions are carried out:
(i) the controller unit drives a transmitting unit, so that an optical tuning transmission signal is generated with a specified channel wavelength;
(ii) the controller unit evaluates a reception signal for whether abort criteria for tuning mode have been fulfilled or not;
(iii) if the abort criteria have been fulfilled, then the controller unit ends tuning mode and drives the transmitting unit into operating mode of a transceiver unit, so that the data signal fed on the data signal port is converted into an optical transmission signal with the channel wavelength for which the abort criteria are detected in tuning mode; and
(iv) if the abort criteria are not fulfilled, then the controller unit continues tuning mode with a further step according to features (a) (ii) and (a) (iii) of this claim, wherein the controller unit drives the transmitting unit in the further step so that an optical tuning signal is generated with a channel wavelength that was not previously used in tuning mode;
(b) allocating the same channel wavelength to a channel input port of an optical multiplexer unit which is connected to an optical output port of the transceiver unit and to a channel output port of an optical demultiplexer unit which is connected to an optical input port of the receiving unit; and
(c) supplying a portion of the optical power of a WDM transmission signal created at a WDM output port of the multiplexer unit to a WDM input port of the demultiplexer unit.

16. The method of claim 15, wherein the controller unit determines an attenuation value between the detected reception signal and the optical tuning transmission signal and, in addition, considers the abort criteria as fulfilled only when the attenuation value is greater than a specific maximum value, for whose determination, in particular, the insertion attenuation of the multiplexer unit and the demultiplexer unit of the WDM transmitting and receiving device is taken into account, as well as the attenuation of the optical path that the tuning transmission signal traverses until it is received by the receiving unit.

17. The method of claim 15, wherein the transmitting unit is further adapted such that, in each tuning step, the tuning transmission signal corresponds to the data signal fed to the transmitting unit.

18. The method of claim 15, wherein the transmitting unit is further adapted such that, in each tuning step, the tuning transmission signal corresponds to the data signal fed to the transmitting unit, wherein at least one characteristic property is impressed on the data signal, with the controller unit transmitting this characteristic property to the transmitting unit.

19. The method of claim 18, wherein the one or more characteristic properties of the identification signal, or the one or more characteristic properties impressed on the data signal, are defined parameters of a modulation component, advantageously with a specified modulation frequency of an amplitude modulation.

20. The method of claim 15, wherein the transmitting unit is further adapted such that, in each tuning step, the tuning transmission signal corresponds to an identification signal that is fed from the controller unit to the transmitting unit and that has at least one characteristic property.

21. The optical WDM transceiver unit of claim 5, wherein the unique identification of the transceiver unit is a serial number or a Media-Access-Control address of the transceiver unit.

* * * * *